United States Patent
De et al.

(10) Patent No.: US 8,561,101 B2
(45) Date of Patent: Oct. 15, 2013

(54) TRUSTED CONTENT ACCESS MANAGEMENT USING MULTIPLE SOCIAL GRAPHS ACROSS HETEROGENEOUS NETWORKS

(75) Inventors: Pradipta De, New Delhi (IN); Kuntal Dey, New Delhi (IN); Nikhil Jain, New Delhi (IN); Venkateswara R. Madduri, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 13/217,445

(22) Filed: Aug. 25, 2011

(65) Prior Publication Data

US 2013/0055302 A1   Feb. 28, 2013

(51) Int. Cl.
H04N 7/16    (2011.01)
G06F 15/173  (2006.01)

(52) U.S. Cl.
USPC ............. 725/25; 726/2; 709/223; 709/224; 709/225

(58) Field of Classification Search
USPC .................... 725/25; 709/223–225
See application file for complete search history.

(56) References Cited

U.S. PATENT DOCUMENTS

| | | | |
|---|---|---|---|
| 6,938,005 B2 | 8/2005 | Iverson et al. | |
| 7,203,753 B2 | 4/2007 | Yeager et al. | |
| 7,213,047 B2 | 5/2007 | Yeager et | |
| 7,222,187 B2 | 5/2007 | Yeager et al. | |
| 7,308,496 B2 | 12/2007 | Yeager et al. | |
| 7,383,433 B2 | 6/2008 | Yeager et al. | |
| 8,135,800 B1* | 3/2012 | Walsh et al. | 709/217 |
| 2004/0088369 A1 | 5/2004 | Yeager et al. | |
| 2006/0259982 A1 | 11/2006 | Upendran | |
| 2008/0133402 A1 | 6/2008 | Kurian et al. | |
| 2008/0178239 A1 | 7/2008 | Yampanis | |
| 2010/0177769 A1 | 7/2010 | Barriga et al. | |
| 2012/0323686 A1* | 12/2012 | Burger et al. | 705/14.55 |
| 2013/0013807 A1* | 1/2013 | Chrapko et al. | 709/238 |

FOREIGN PATENT DOCUMENTS

WO    2009077193 A2    6/2009

OTHER PUBLICATIONS

Quercia et al., "Sybil Attacks Against Mobile Users: Friends and Foes to the Rescue," IEEE INFOCOMM 2010, 9 pages.
Pouwelse et al., "Tribler: A Social-Based Peer-to-Peer System," The 5th International Workshop on Peer-to-Peer Systems (IPTPS), 2006.
Golbeck, "Generating Predictive Movie Recommendations from Trust in Social Networks," University of Maryland, College Park, MD, May 2006.

(Continued)

*Primary Examiner* — Nasser Goodarzi
*Assistant Examiner* — Fred Peng
(74) *Attorney, Agent, or Firm* — Gibb & Riley, LLC

(57) ABSTRACT

A method, system, and computer readable storage device (that stores the method) extract connectivity information from multiple telecommunication services, provided by a single multiple service provider. The method, system, and device merge the separate connectivity information from each service in a unified graph of telephone service users and digital service users (including common users of both services). The method, system, and device assign trust values based on the connectivity information and shared data content between users. The method, system, and device may also issue a proxy certificate of authority (CA), by a trusted CA residing within the digital service, to provide digital service to a user of the telephone service in the unified graph, when the trusted CA is a nearest trusted CA in the unified graph.

5 Claims, 12 Drawing Sheets

(56) References Cited

OTHER PUBLICATIONS

Marti et al., "DHT Routing Using Social Links," 3rd International Workshop on Peer-to-Peer Systems (IPTPS), Feb. 2004.
Golbeck, "Semantic Web Interaction through Trust Network Recommender Systems," End User Semantic Web Interaction Workshop at the 4th International Semantic Web Conference, 2005.
Golbeck et al., "Inferring Binary Trust Relationships in Web-Based Social Networks," ACM Transactions on Internet Technology, vol. 6, No. 4, Nov. 2006, pp. 497-529.
Massa et al., "Trust-aware Recommender Systems," RecSys, Oct. 2007, pp. 17-24.
Kale, "Modeling Trust and Influence on Blogosphere Using Link Polarity," Thesis submitted to University of Maryland, 2007, 43 pagesp.
Quercia et al., "Lightweight Distributed Trust Propagation," Seventh IEEE International Conference on Data Mining, 2007, pp. 282-291.
Kamvar et al., The EigenTrust Algorithm for Reputation Management in P2P Networks, Budapest, Hungary, May 2003.
Richardson et al., "Trust Management for the Semantic Web," ISWC, LNCS 2870, pp. 351-368, 2003.
Guha et al., "Propagation of Trust and Distrust," New York, NY, May 2004, pp. 403-412.
O'Donovan et al., "Trust in Recommender Systems," IUI, San Diego, CA, Jan. 2005, pp. 167-174.
Bohm et al., "A Flexible Architecture for Privacy-Aware Trust Management," Journal of Theoretical and Applied Electronic Commerce Research, ISSN 0718-1876 Electronic Version, vol. 5, Issue 2, Aug. 2010, pp. 77-96.
Oredope et al., "An Analysis of Mobile Signalling in Converged Networks," IEEE 9th Malaysia International Conference on Communications, Dec. 2009, pp. 629-634.
Yu et al., "SybilGuard: Defending Against Sybil Attacks via Social Networks," SIGCOMM, Sep. 2006, pp. 267-278.
Danezis et al., "Sybil-resistant DHT Routing," Computer Security—ESORICS 2005, 14 pages.
Wang et al., "An Efficient and Secure Peer-to-Peer Overlay Network," Proceedings of the IEEE Conference on Local Computer Networks 30th Anniversary (LCN '05), 2005, 8 pages.
Bazzi et al., "On the Establishment of Distinct Identities in Overlay Networks," PODC, Jul. 2005, pp. 312-320.
Dinger et al., "Defending the Sybil Attack in P2P Networks: Taxonomy, Challenges, and a Proposal for Self-Registration," ARES 2006, The First International Conference on Availability, Reliability and Security, 8 pages.
Castro et al., "Secure Routing for Structured Peer-to-Peer Overlay Networks," Proceedings of the 5th Usenix Symposium on Operating Systems Design and Implementation, Dec. 2002, 16 pages.
NDS Conditional Access, Middleware, DVR, and Interactive Technologies, http://nds.com, NDS Limited 2011.

\* cited by examiner

TRUSTED CONTENT ACCESS MANAGEMENT USING MULTIPLE SOCIAL GRAPHS ACROSS HETEROGENEOUS NETWORKS

BACKGROUND

1. Field of the Invention

Embodiments generally relate to a method and system for extracting connectivity information from multiple service connection graphs provided by a single multiple service provider, including a telephone service and a digital service, and merging the extracted connectivity information to build trust relationships across the multiple service connection graphs of the multiple services. A degree of trust is assigned to each connection based on the connectivity information and shared data content. The degree of trust forms a basis for providing content to legitimate users across the multiple services by using a distributed certificate of authority (CA). In particular, an embodiment may issue a proxy Certificate Authority, upon request by a node of a connectivity graph for the telephone service from a nearest trusted Certificate Authority in a connectivity graph for the digital service.

2. Description of the Related Art

A single service provider can provide multiple services. For example, the single multiple service provider can provide quad-play, including cellular telephony, landline telephony, digital broadband, and digital TV. The convergence of multiple services enables innovative applications, for example, sharing of digital TV content among set-top boxes of users based on information mined from telephone call graphs.

Unfortunately, the convergence of multiple services can also lead to unauthorized sharing of digital content with users, who are not authorized to access such digital content. FIG. 1 illustrates a telephone service network 300 and a digital service network 302 that are provided to a number of users 304 by a single multiple service provider. When the telephone service and the digital service provided by the single multiple service provider partially overlap among some number of the users 304, connected connectivity information, such as a high frequency of calls and a high call volume that evidence a pair of friends, can be mined from the telephone service network 300 (dashed lines) by the digital service network 302 (solid lines) to advertise and provide, for example, a digital video previously downloaded by one of a pair of friends to the other.

An issue addressed by an embodiment is to manage access to digital content encrypted by a private key of the digital service provider and to protect digital rights by providing a public key from a trusted certificate of authority (CA) to only those users, who have a right of access or can be trusted with a right of access to the digital content.

SUMMARY

In view of the foregoing, an exemplary embodiment disclosed herein provides a computer-implemented method that determines connectivity graphs among users for each service provided by a single multi-service provider. The multi-service provider provides telephone service and digital service. The connectivity graphs for the telephone service and the digital service include the number of common users represented as nodes in the connectivity graphs. Further, the method creates a unified graph that merges the connectivity graphs for the telephone service and the digital service by identifying a direct connectivity between a first node and a second node when the first node is connected to the second node by a first edge in the unified graph, identifying a common friend connectivity between a third node and a fourth node when the third node is connected by a second edge to a first intermediary node (which is connected by a third edge to the fourth node in the unified graph), and identifying a community connectivity including a fifth node, a sixth node, a second intermediary node, and a third intermediary node when the fifth node and the sixth node are identified by the direct connectivity. The second intermediary node and the third intermediary node are identified by the direct connectivity, and the second intermediary node and the third intermediary node, respectively, are both identified by the common friend connectivity between the fifth node and the sixth node. Further, the method assigns, a connectivity value between the each pair of users of the unified graph, based on values associated with the direct connectivity, the common friend connectivity, and the community connectivity.

Another exemplary embodiment disclosed herein provides a computer-implemented method that determines connectivity graphs for users of a digital broadband service and a digital cable service. The connectivity graphs include the number of common users represented as nodes in the connectivity graphs. Further, the method creates a unified graph that merges the connectivity graphs for the digital broadband service and the digital cable service by determining the number of shared areas of interest between each pair of users in the unified graph, based on identification of file names, key words, and metadata from data transmitted to the each pair of users, etc. Additionally, the method determines the number of shared contents between each pair of users in the unified graph based on identification of TV programs, movies, and video clips transmitted to the each pair of users, etc. Further, the method assigns a trust value to the each pair of users based on a combination of the number of shared areas of interest and the number of shared contents between the each pair of users in the unified graph. Also, the method identifies peers in the unified graph, based on similarities of the trust value.

Yet another exemplary embodiment disclosed herein provides a computer-implemented method that determines connectivity graphs among users for each service provided by a single multi-service provider. The multi-service provider provides telephone service including a landline telephone service, a cellular telephone service, and/or a digital service (including at least one of a digital broadband service and a digital cable service). The connectivity graphs for the telephone service and the digital service include the number of common users represented as nodes in the connectivity graphs. Further, the method creates a unified graph that merges the connectivity graphs for the telephone service and the digital service by identifying the direct connectivity between a first node and a second node (when the first node is connected to the second node by a first edge in the unified graph) and the duration of the direct connectivity; identifying a common friend connectivity between a third node and a fourth node when the third node is connected by a second edge to a first intermediary node (which is connected by a third edge to the fourth node in the unified graph) and a duration of the common friend connectivity; and identifying the community connectivity (including a fifth node, a sixth node, a second intermediary node, and a third intermediary node) when the fifth node and the sixth node are identified by the direct connectivity and a duration of the community connectivity. The second intermediary node and the third intermediary node are identified by the direct connectivity, and the second intermediary node and the third intermediary node, respectively, are both identified by the common friend connectivity between the fifth node and the sixth node. The method assigns a first trust value between the each pair of users, based on values associated with the direct connectivity, the common friend connectivity, and the community connectivity, and durations of the direct connectivity, the common friend connectivity, and the community connectivity. Also, the method determines the number of shared areas of interest between each pair of users in the unified graph, based on identification of file names, key words, and metadata from digital data transmitted to the each pair of users, etc. Further, the method determines the number of shared contents between each pair of users in the unified graph based on identification of TV programs, movies, and/or video clips digitally transmitted to the each pair of users. Next, the method assigns a second trust value to the each pair of users based on the number of shared areas of interest and the number of shared contents between the each pair of users. The method creates a trust matrix. Each element of the trust matrix corresponds to a node of the unified graph that has a third trust value based on the first trust value and the second trust value. Additionally, the method and identifies peers in the unified graph, based on similarities of the third trust value.

Yet another exemplary embodiment disclosed herein provides a computer-implemented method that determines connectivity graphs among users for each service provided by a single multi-service provider. The multi-service provider provides telephone service, including a landline telephone service, a cellular telephone service, and/or a digital service (including a digital broadband service and/or a digital cable service). The connectivity graphs for the telephone service and the digital service include the number of common users represented as nodes in the connectivity graphs. Further, the method creates a unified graph that merges the connectivity graphs for the telephone service and the digital service by identifying a direct connectivity between a first node and a second node (when the first node is connected to the second node by a first edge in the unified graph) and a duration of the direct connectivity; identifying a common friend connectivity between a third node and a fourth node when the third node is connected by a second edge to a first intermediary node (which is connected by a third edge to the fourth node in the unified graph) and a duration of the common friend connectivity; and identifying a community connectivity (including a fifth node, a sixth node, a second intermediary node, and a third intermediary node) when the fifth node and the sixth node are identified by the direct connectivity and a duration of the community connectivity. The second intermediary node and the third intermediary node are identified by the direct connectivity, and the second intermediary node and the third intermediary node, respectively, are both identified by the common friend connectivity between the fifth node and the sixth node. Further, the method assigns a first trust value between each pair of users based on values associated with the direct connectivity, the common friend connectivity, and the community connectivity, and durations of the direct connectivity, the common friend connectivity, and the community connectivity. The method determines the number of shared areas of interest between each pair of users in the unified graph based on identification of file names, key words, and/or metadata from digital data transmitted to the each pair of users. Also, the method determines the number of shared contents between each pair of users in the unified graph based on identification of TV programs, movies, and/or video clips digitally transmitted to the each pair of users. Further, the method assigns a second trust value to the each pair of users based on the number of shared areas of interest and the number of shared contents between the each pair of users. Additionally, the method creates a trust matrix. Each element of the trust matrix corresponds to a node of the unified graph that has a third trust value based on the first trust value and the second trust value. The method partitions a connectivity graph for the digital service in the unified graph into sub-graphs using a decentralized algorithm. Further, the method prevents assignment of a trusted certificate of authority (CA) to a node in a first sub-graph when an inter-socialness value of the first sub-graph falls below a threshold. The inter-socialness value comprises the percentage of nodes that have the common friend connectivity to another node (which belongs to another sub-graph). Also, the method assigns a trusted CA to a node in a sub-graph other than the first sub-graph when the inter-socialness value of that sub-graph is equal to or greater than the threshold. The method issues a proxy CA in that sub-graph to provide the digital service to a node for the telephone service in the unified graph, when the trusted CA is the nearest trusted CA of the unified graph.

BRIEF DESCRIPTION OF THE SEVERAL VIEWS OF THE DRAWINGS

The embodiments will be better understood from the following detailed description with reference to the drawings, which are not necessarily drawing to scale and in which.

DETAILED DESCRIPTION

Figure 1:
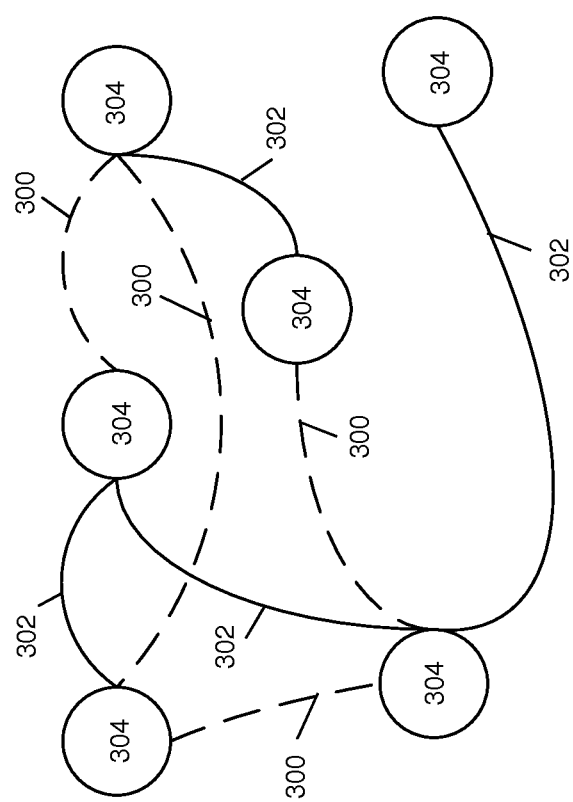
FIG. 1 schematically illustrates a telephone service network and a digital service network that are provided to a number of users by a single multiple service provider in the related art.

The exemplary embodiments and the various features and advantageous details thereof are explained more fully with reference to the non-limiting exemplary embodiments that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary embodiments. The examples used herein are intended to merely facilitate an understanding of ways in which the exemplary embodiments may be practiced and to further enable those of skill in the art to practice the exemplary embodiments. Accordingly, the examples should not be construed as limiting the scope of the exemplary embodiments.

As stated above, the problem to be solved by an embodiment is to manage access to digital content encrypted by a private key of the digital service provider and to protect digital rights by providing a public key from a trusted certificate of authority (CA) to only those users, who have a right of access or can be trusted with a right of access to the digital content.

Figure 2:
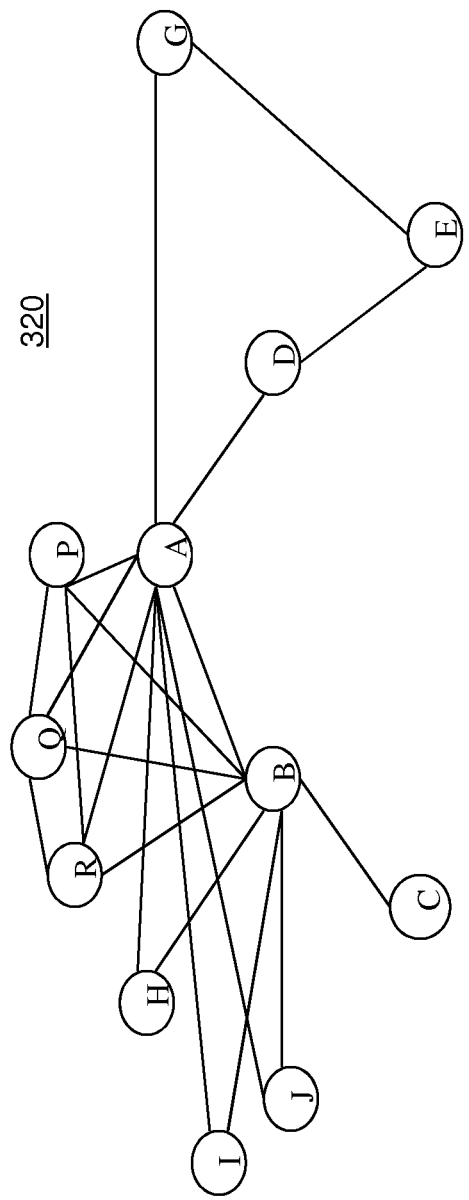
FIG. 2 schematically illustrates a connectivity graph for a number of users of a service, provided by the multiple service provider, including direct connectivity, common friend connectivity, and a community in an embodiment.

FIG. 2 illustrates a connectivity graph 320 for the number of users A-E, G-J, and P-R of a service, provided by the multiple service provider, including direct connectivity, common friend connectivity, and a community, for example, a clique, in an embodiment. Users may correspond to nodes in the connectivity graph 320. Nodes A and B show a direct type of connectivity, in which A and B are connected by single edge. Intermediary nodes—H, I, J, P, Q, and R—may show a common friend type of connectivity, where each of nodes—H, I, J, P, Q, and R—is connected by a first edge to node A and by a second edge to node B. In addition, nodes A and B may form a community connectivity, for example, a clique with intermediary nodes: H, I, J, P, Q, and R, in which each intermediary node is connected to every other intermediary node. Alternatively, other community connectivities may be formed in which connectivities are formed between various combinations of direct and indirect connectivities.

Figure 3:
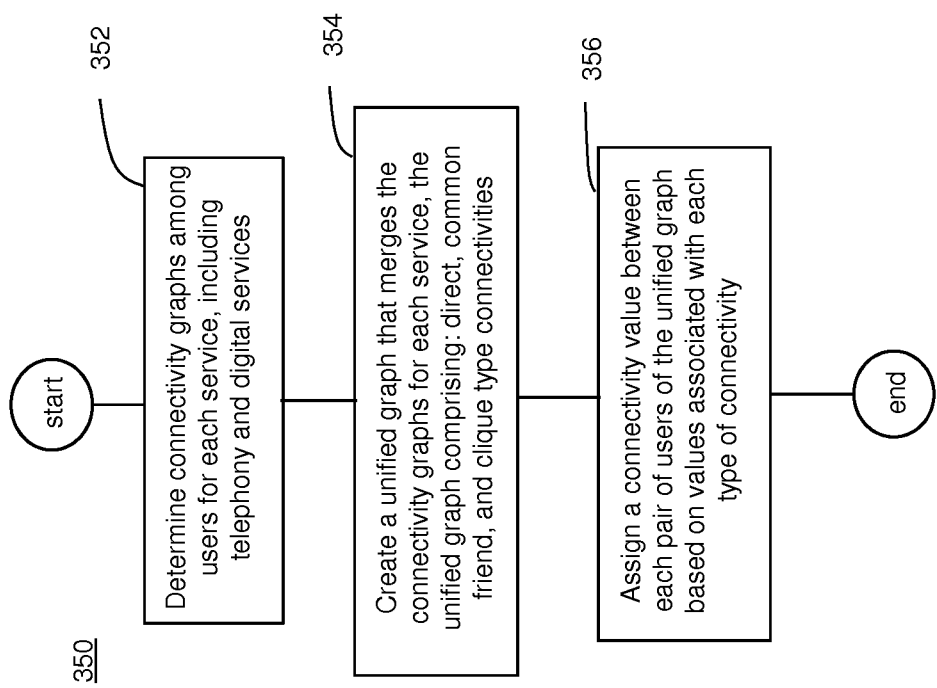
FIG. 3 illustrates a flow chart of a method that provides a connectivity value between each pair of users of a unified graph, based on values associated with each type of connectivity in an embodiment.

Referring to FIG. 3, a flow chart 350 illustrates an aspect of a computer-implemented method that assigns a connectivity value between each pair of users of a unified graph, based on values associated with each type of connectivity in an embodiment.

The method may determine connectivity graphs among users for each service provided by a single multi-service provider, which provides telephone service and digital service in step 352. The connectivity graphs for the telephone service and the digital service may include the number of common users represented as nodes in the connectivity graphs. The method may create a unified graph that merges the connectivity graphs for the telephone service and the digital service. The process of creating the unified graph may include identifying a direct connectivity between a first node and a second node when the first node is connected to the second node by a first edge in the unified graph The process of creating the unified graph may further include identifying a common friend connectivity between a third node and a fourth node when the third node is connected by a second edge to a first intermediary node. The first intermediary node is connected by a third edge to the fourth node in the unified graph. The process of creating the unified graph may also include identifying a community. Such a community may, for example, be a clique connectivity including a fifth node, a sixth node, a second intermediary node, and a third intermediary node, when the fifth node and the sixth node are identified by the direct connectivity. The second intermediary node and the third intermediary node are identified by the direct connectivity, and the second intermediary node and the third intermediary node, respectively, are both identified by the common friend connectivity between the fifth node and the sixth node or another community connectivity in step 354. The method may assign a connectivity value between each pair of users of the unified graph, based on values associated with each of the direct connectivity, the common friend connectivity, and the community connectivity in step 356.

The telephone service may include at least one of a landline telephone service and a cellular telephone service, and the digital service may include at least one of a digital broadband service and a digital cable service. A combination of values associated with any of the direct connectivity, the common friend connectivity, and the community connectivity may be normalized. The connectivity of the unified graph may be determined by a connectivity value exceeding a threshold value of the normalized combination of the values associated with any of the direct connectivity, the common friend connectivity, and the community connectivity. A value associated with the direct connectivity may be greater than a value associated with the common friend connectivity.

Figure 4:
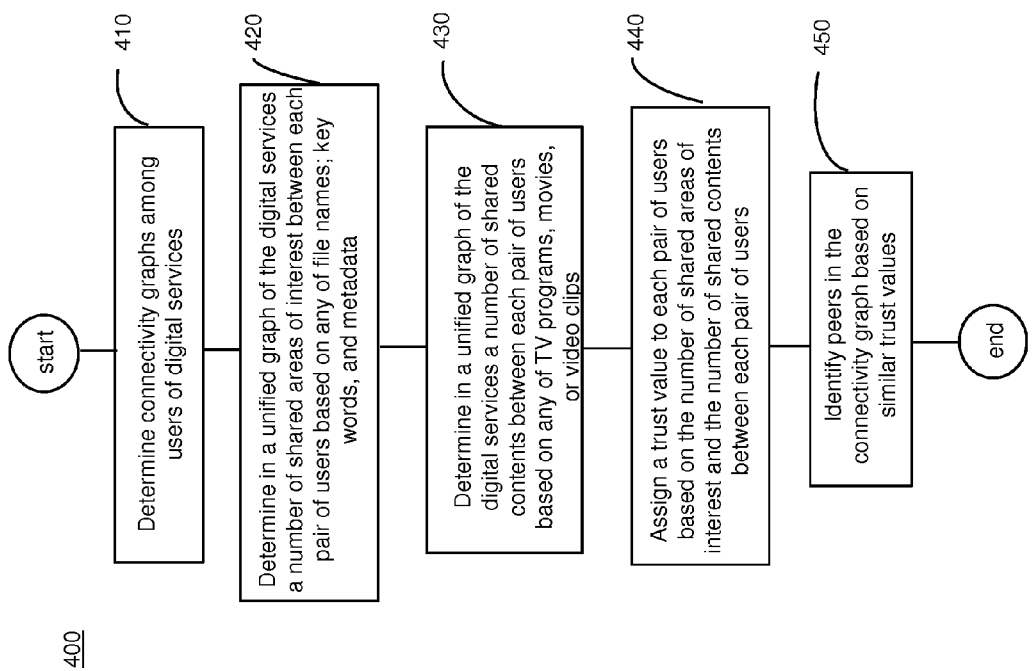
FIG. 4 illustrates a flow chart of a method that provides for identifying peers in the connectivity graph, based on similar trust values in an embodiment.

Referring to FIG. 4, a flow chart 400 illustrates an aspect of a computer-implemented method that provides for identifying peers in a connectivity graph for a digital service, based on similar trust values in an embodiment. The method may determine, by a computer, connectivity graphs for users of a digital broadband service and a digital cable service, in which the connectivity graphs may include the number of common users represented as nodes in the connectivity graphs in step 410. The method may also create a unified graph that merges the connectivity graphs for the digital broadband service and the digital cable service, said creating of said unified graph comprising. The method may also determine the number of shared areas of interest between each pair of users in the unified graph, based on identification of: file names, key words, and metadata from data transmitted to each pair of users in step 420. The method may also determine by the number of shared digital contents, between each pair of users in the unified graph, based on identification of TV programs, movies, or video clips transmitted to each pair of users in step 430. The method may also assign a trust value to each pair of users, based on the number of shared areas of interest and the number of shared digital contents between each pair of users in the unified graph in step 440. The method may also identify peers in the unified graph, based on trust values of a similar value in step 450.

The trust value for each pair of users, based on the number of shared areas of interest and the number of shared contents, may be normalized. The normalized trust value may be divided into ranges, corresponding to one of quartiles and quintiles. Each of the ranges may identify a corresponding one of the peers. The metadata may include data identifying similar content.

Figure 5:
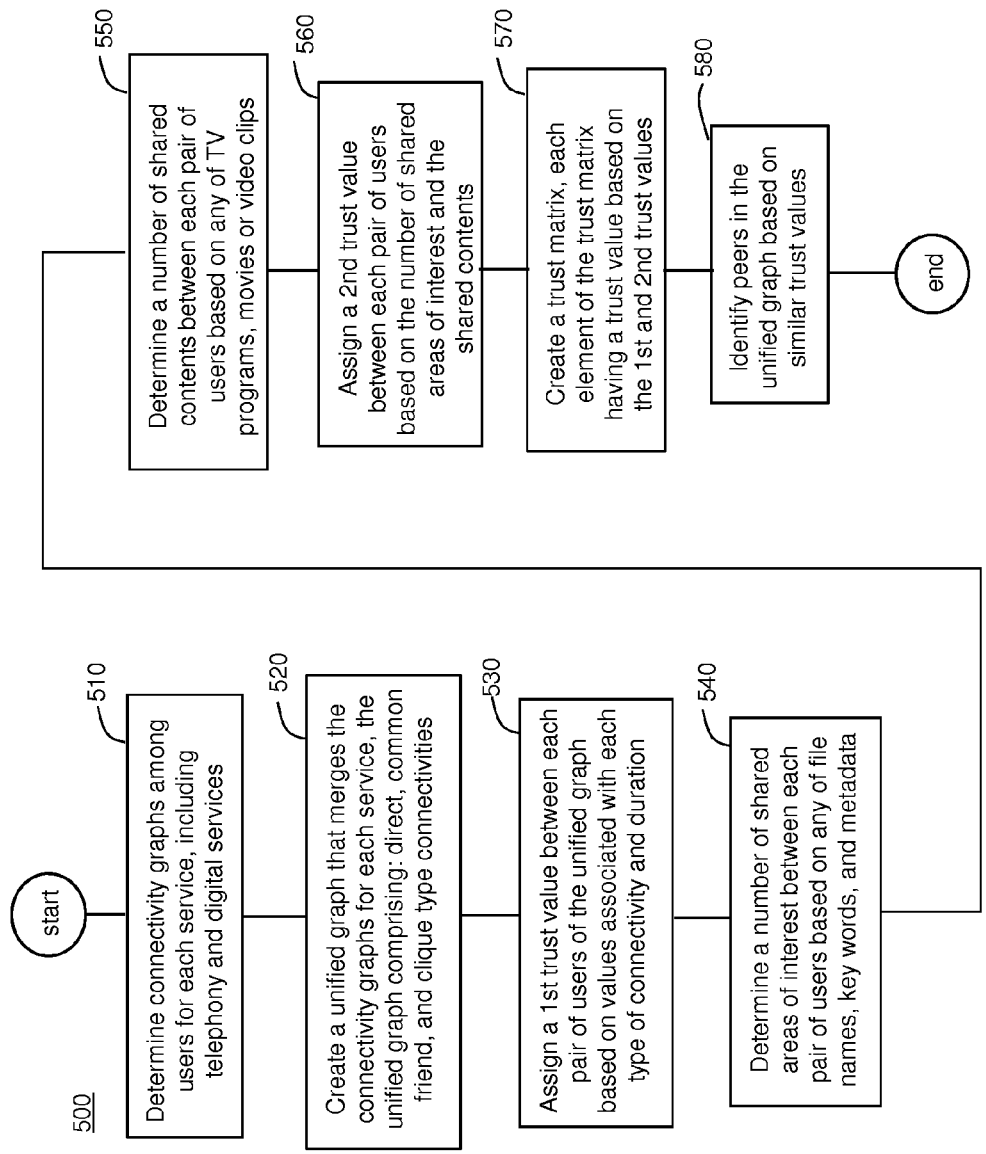
FIG. 5 illustrates a flow chart of a method that provides for creating a trust matrix based on types of connectivity among users, and trust values assigned to the users based on duration of connectivity, a number of shared areas of interest and a number of shared contents in an embodiment.

Referring to FIG. 5, a flow chart 500 illustrates an aspect of a computer-implemented method that provides for creating a trust matrix based on types of connectivity among users, and trust values assigned to the users based on duration of a connectivity type, the number of shared areas of interest and the number of shared contents in an embodiment. The method may determine connectivity graphs among users for each service provided by a single multi-service provider in step 510. The multi-service provider can provide telephone service, including at least one of a landline telephone service, a cellular telephone service, and digital service, including at least one of a digital broadband service and a digital cable service. The connectivity graphs for the telephone service and the digital service may include the number of common users represented as nodes in the connectivity graphs. The method may also create a unified graph that merges the connectivity graphs for the telephone service and the digital service in step 520. The process of creating the unified graph may include identifying a direct connectivity between a first node and a second node when the first node is connected to the second node by a first edge in the unified graph, and a duration of the direct connectivity. The process of creating the unified graph may also include identifying a common friend connectivity between a third node and a fourth node when the third node is connected by a second edge to a first intermediary node, which is connected by a third edge to the fourth node in the unified graph, and a duration of the common friend connectivity. The process of creating the unified graph may further include identifying a community, for example, a clique connectivity including a fifth node, a sixth node, a second intermediary node, and a third intermediary node, when the fifth node and the sixth node are identified by the direct connectivity and a duration of the community connectivity. The second intermediary node and the third intermediary node are identified by the direct connectivity, and the second intermediary node and the third intermediary node, respectively, are both identified by the common friend connectivity between the fifth node and the sixth node or another community connectivity. The durations of the direct connectivity, the common friend connectivity, and the community connectivity may be determined from call histories.

The method may assign a first trust value between each pair of users, based on values associated with each type of connectivity and the duration in step 530. The method may also determine the number of shared areas of interest between each pair of users in the unified graph, based on identification of: file names, key words, and metadata from digital data transmitted to each pair of users in step 540. The method may also determine the number of shared contents between each pair of users in the unified graph, based on identification of TV programs, movies, or video clips digitally transmitted to each pair of users in step 550. The method may further assign a second trust value to each pair of users, based on the number of shared areas of interest and the number of shared contents between each pair of users in step 560. The method may further create a trust matrix, each element of the trust matrix corresponding to a node of the unified graph that has a third trust value based on the first trust value and the second trust value in step 570. The method may yet further identify peers in the unified graph, based on similar third trust values in step 580.

A combination of first trust values associated with any of the direct connectivity, the common friend connectivity, and the community connectivity types, and with any of the durations of each of the direct connectivity, the common friend connectivity, and the community connectivity types, may be normalized. The connectivity in the unified graph may be determined by exceeding a threshold value of the normalized combination of the first trust values associated with any of the direct connectivity, the common friend connectivity, and the community connectivity, and with any of the durations of each of the direct connectivity, the common friend connectivity, and the community connectivity. The third trust value may be normalized and may be divided into ranges, corresponding to one of quartiles and quintiles. Each of the ranges may identify a corresponding one of the peers.

Figure 6:
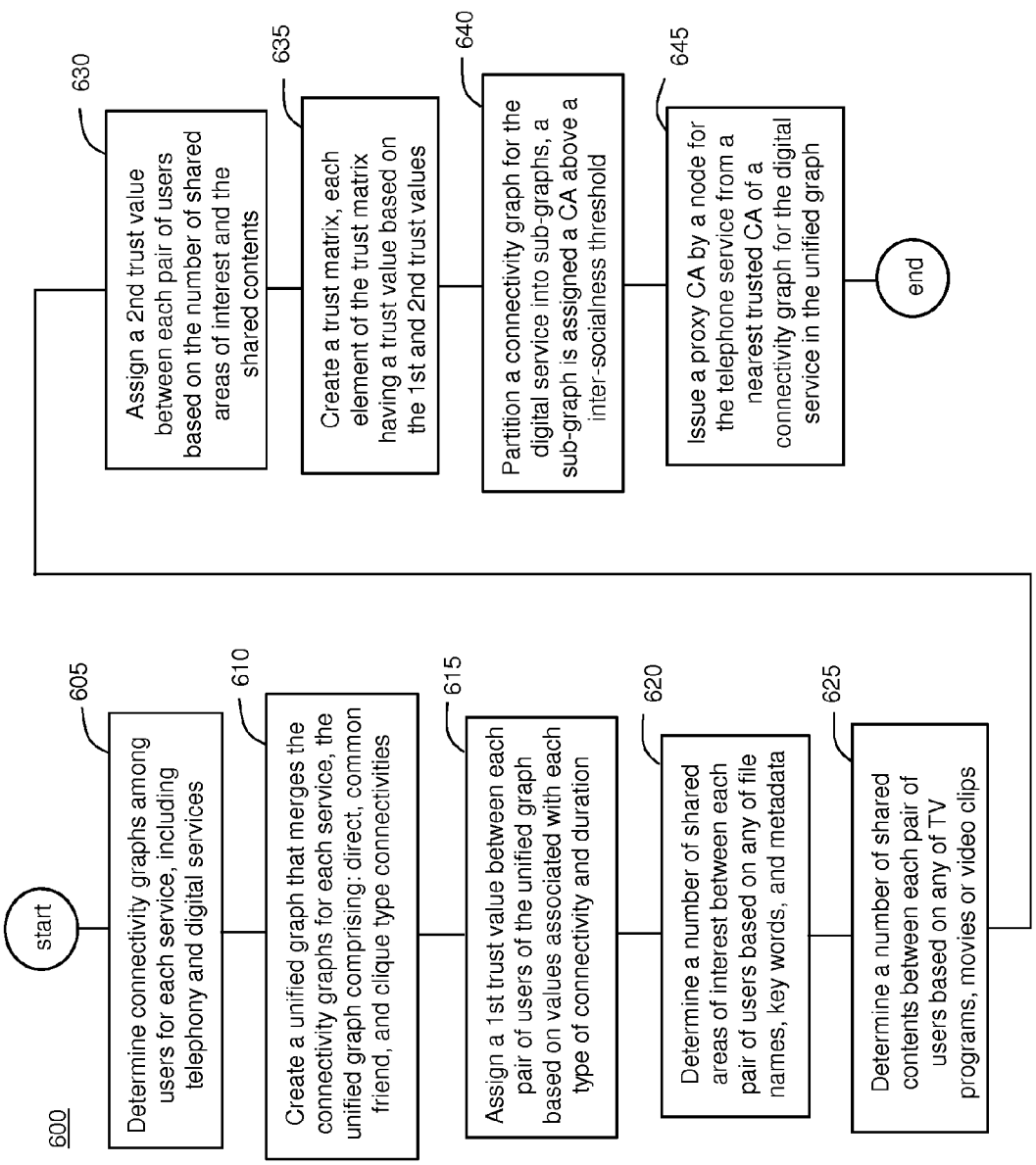
FIG. 6 illustrates a flow chart of a method that provides for issuing a proxy certificate of authority upon request by a node of the connectivity graph for the telephone service in the unified graph from a nearest trusted CA of the connectivity graph for the digital service in the unified graph in an exemplary embodiment.

FIG. 6 illustrates a flow chart of an aspect of a computer-implemented method that provides for issuing a proxy certificate of authority upon request by a node of the telephone service in the unified graph from a nearest trusted CA of the digital service in the unified graph in an exemplary embodiment. The method may determine connectivity graphs among users for each service provided by a single multi-service provider, which provides telephone service, including at least one of landline telephony and cellular telephony, and digital service, including at least one of broadband and cable in step 605. The connectivity graphs for the telephone service and the digital service may include the number of common users. The method may also create a unified graph that merges the connectivity graphs for each service in step 610. The process of creating the unified graph may include identifying a direct connectivity between a first node and a second node when the first node is connected to the second node by a first edge in the unified graph, and a duration of the direct connectivity. The process of creating the unified graph may also include identifying a common friend connectivity between a third node and a fourth node when the third node is connected by a second edge to a first intermediary node, which is connected by a third edge to the fourth node in the unified graph, and a duration of the common friend connectivity. The process of creating the unified graph may further include identifying a community, for example, a clique connectivity including a fifth node, a sixth node, a second intermediary node, and a third intermediary node, when the fifth node and the sixth node are identified by the direct connectivity and a duration of the community connectivity. The second intermediary node and the third intermediary node are identified by the direct connectivity, and the second intermediary node and the third intermediary node, respectively, are both identified by the common friend connectivity between the fifth node and the sixth node or another community connectivity. The durations of the direct connectivity, the common friend connectivity, and the community connectivity may be determined from call histories.

The method may assign a first trust value between each pair of users, based on values associated with each type of connectivity and the durations in step 615. The method may also determine the number of shared areas of interest between each pair of users in the unified graph, based on identification of: file names, key words, and metadata from digital data transmitted to each pair of users in step 620. The method may also determine the number of shared contents between each pair of users in the unified graph, based on identification of TV programs, movies, or video clips digitally transmitted to each pair of users in step 625. The method may further assign a second trust value to each pair of users, based on the number of shared areas of interest and the number of shared contents between each pair of users in step 630. The method may further create a trust matrix, each element of the trust matrix corresponding to a node of the unified graph that has a trust value based on the first trust value and the second trust value in step 635.

The method may partition a connectivity graph for the digital service in the unified graph into sub-graphs by a decentralized algorithm, in which assignment of a trusted certificate of authority (CA) is prevented to a node in a first sub-graph when an inter-socialness value of the first sub-graph falls below a threshold, the inter-socialness value comprising a percentage of nodes that have common friend connectivity to another node, which belongs to another sub-graph, in which a trusted CA is assigned to a node in a sub-graph other than the first sub-graph, when the inter-socialness value of the sub-graph other than the first sub-graph is equal to or greater than the threshold in step 640. The method may issue a proxy CA, by the trusted CA in a sub-graph other than the first sub-graph, to provide digital service to a node for the telephone service in the unified graph, when the trusted CA is a nearest trusted CA in the unified graph in step 645.

Each trusted CA in a sub-graph, other than said first sub-graph, may be assigned to a node of the sub-graph having a genuineness value, based on a sum of all third trust values from nodes other than that assigned to the trusted CA in the sub-graph. The trusted CA may be determined by selecting k nodes of the sub-graph having a highest genuineness value, and by selecting one node of the k nodes to be assigned the trusted CA based on a measure of highest betweeness centrality of the k nodes in the sub-graph. A combination of first trust values associated with any of the direct connectivity, the common friend connectivity, and the community connectivity, and with any of the durations of each of the direct connectivity, the common friend connectivity, and the community connectivity, may be normalized. The connectivity of the unified graph may be determined by exceeding a threshold value of the normalized combination of the first trust values associated with any of the direct connectivity, the common friend connectivity, and the community connectivity, and with any of the durations of each of the direct connectivity, the common friend connectivity, and the community connectivity.

As will be appreciated by one skilled in the art, aspects of the embodiments herein may be embodied as a system, method or computer program product. Accordingly, aspects of the embodiments herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments herein may take the form of a computer program product embodied in at least one computer readable medium(s) having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments herein may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to the embodiments herein. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
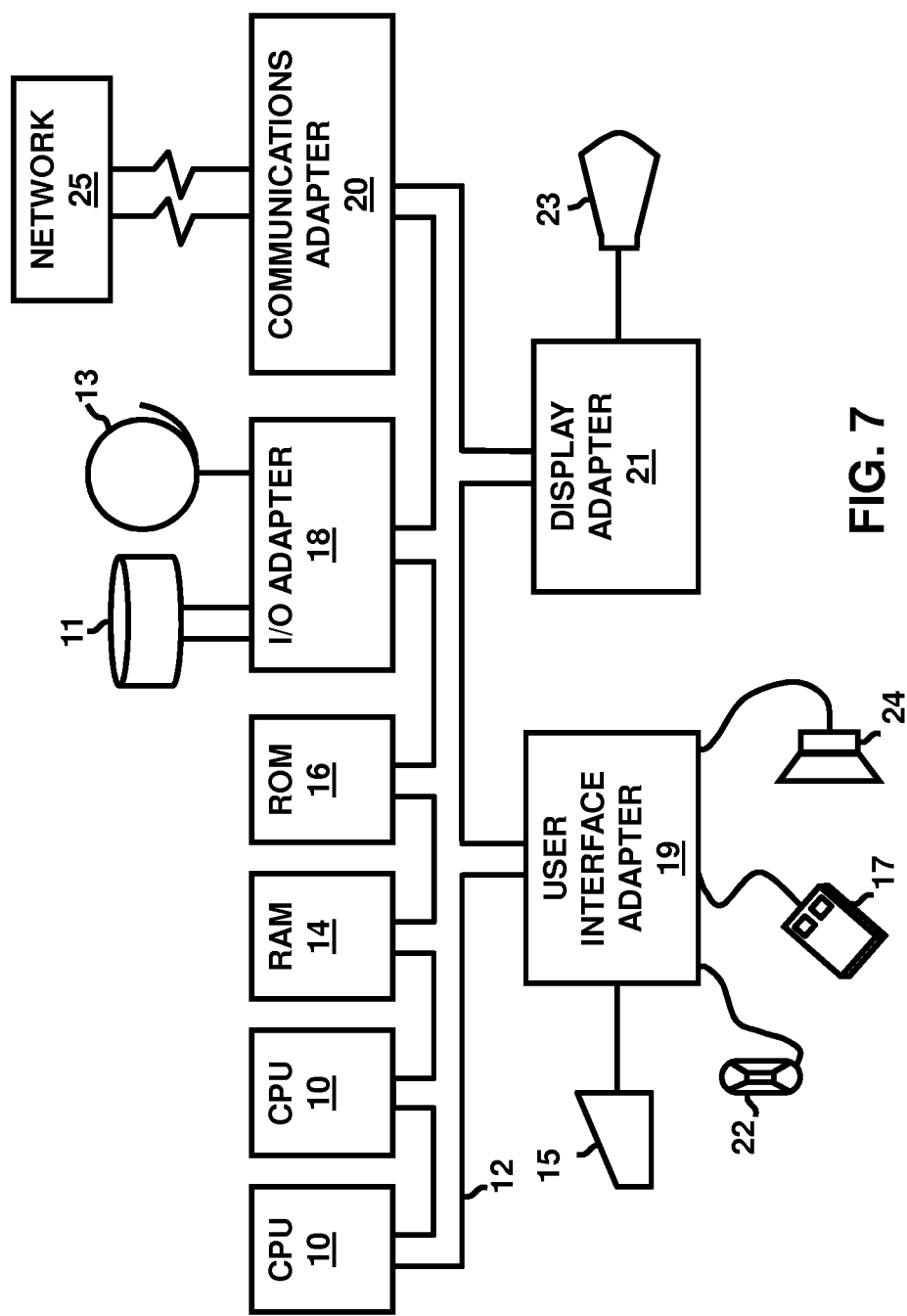
FIG. 7 illustrates a block diagram of a hardware configuration of an information handling/computer system in accordance with the embodiments

A representative hardware environment for practicing the embodiments herein are depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments herein. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment Types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will select the proxy server code, determine on which computers to place the proxy servers' code, transmit the proxy server code, then install the proxy server code on the proxy computer. The process software will be transmitted to the proxy server then stored on the proxy server.

Figure 8:
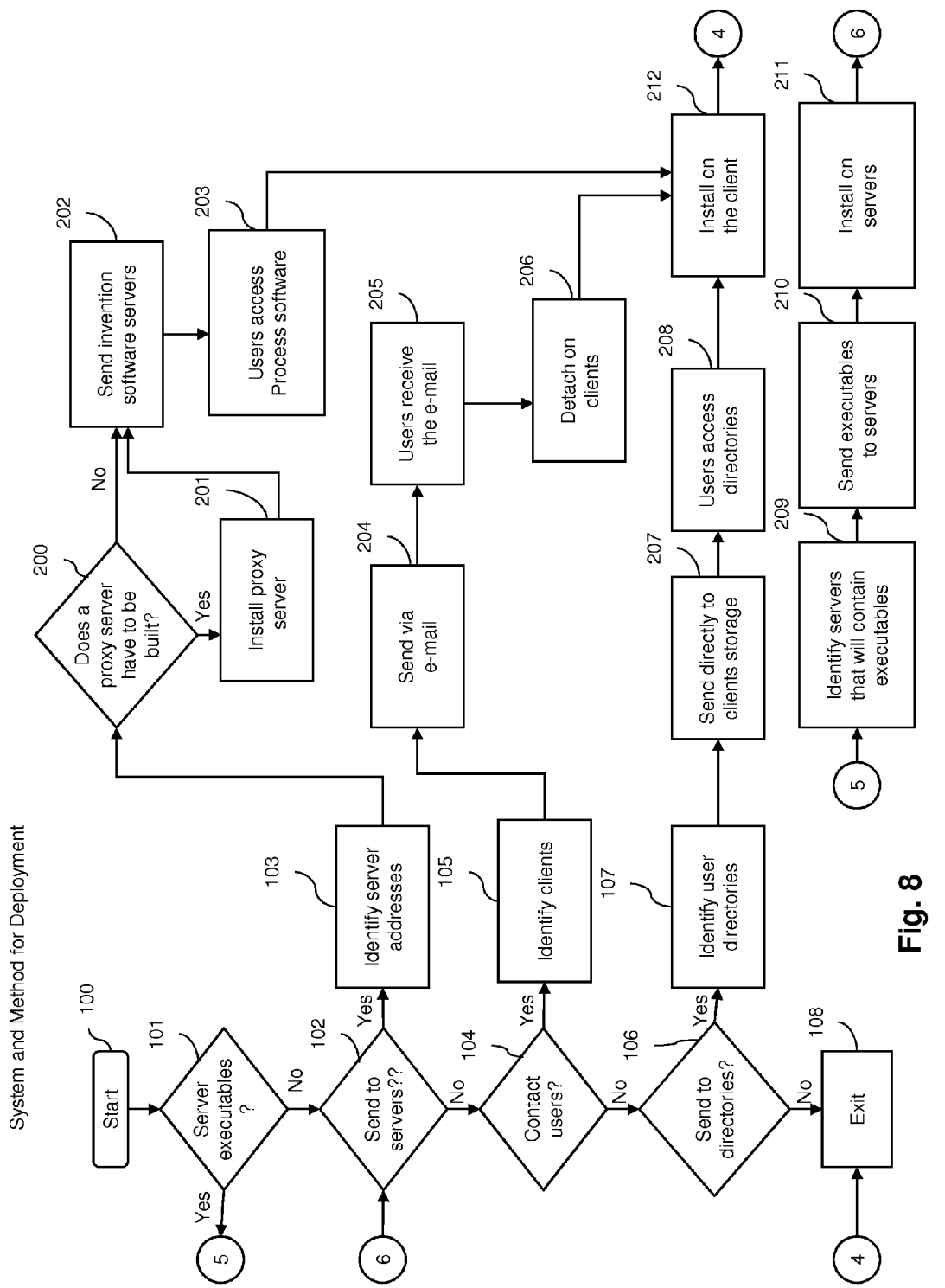
FIG. 8 is a schematic diagram illustrating an exemplary hardware environment that can be used to implement the embodiments herein.

In FIG. 8, Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail 204 to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 9:
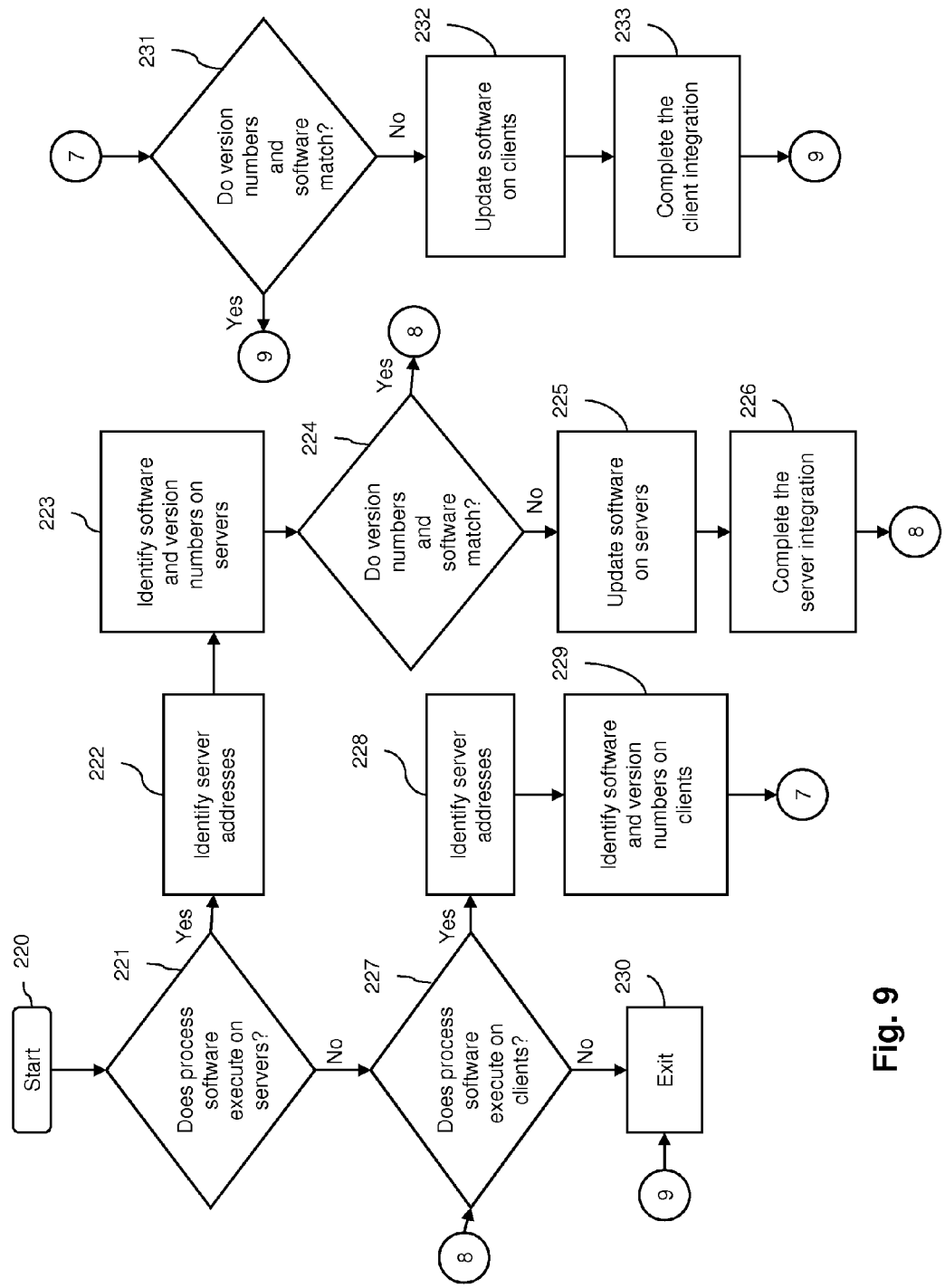
FIG. 9 is a flow diagram of a design process used in semiconductor design, manufacture, and/or test.

In FIG. 9, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of the OS, applications, and NOS that have been tested with the process software 224. If all of the versions match and there is no missing required software the integration continues in 227.

If at least one of the version numbers do not match, then the unmatched versions are updated on the server or servers with the correct versions 225. Additionally, if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229. The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If at least one of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from at least one server. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches the number that begins to affect the performance of that server, other servers are accessed to increase the capacity and to share the workload Likewise when other measurements of use such as network bandwidth, memory usage, storage usage, etc. approach a capacity so as to affect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a payas-you-go model.

The process software can be stored on a shared file system accessible from at least one server. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches the number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 10:
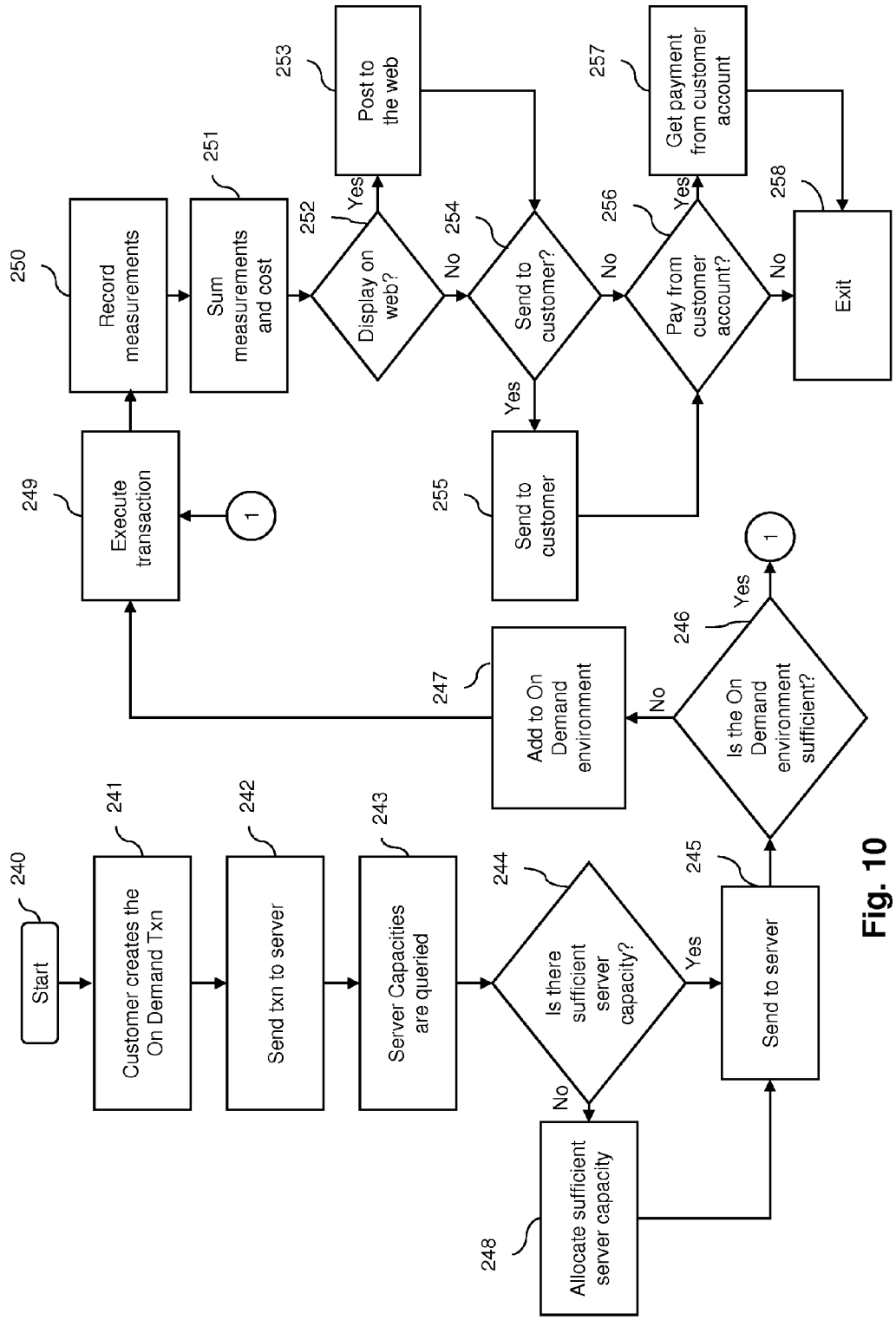
FIG. 10 is a flow diagram of a design process used in semiconductor design, manufacture, and/or test.

In FIG. 10, Step 240 begins the On Demand process. A transaction is created that contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, then the transaction is executed 249.

The usage measurements are recorded 250. The usage measurements consist of the portions of those functions in the On Demand environment that are used to process the transaction. The usage of such functions are, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 11:
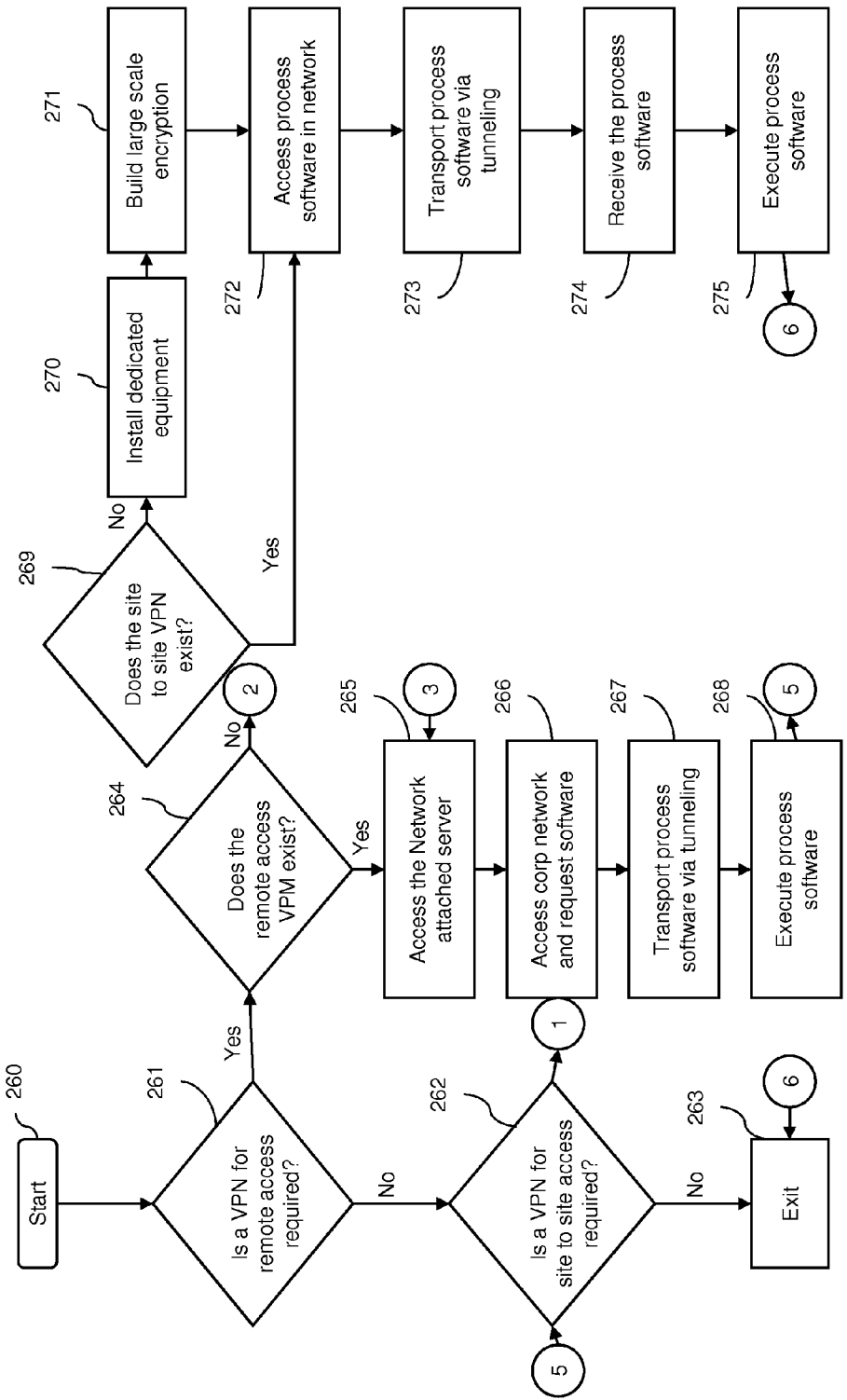
FIG. 11 is a flow diagram of a design process used in semiconductor design, manufacture, and/or test.
Figure 12:
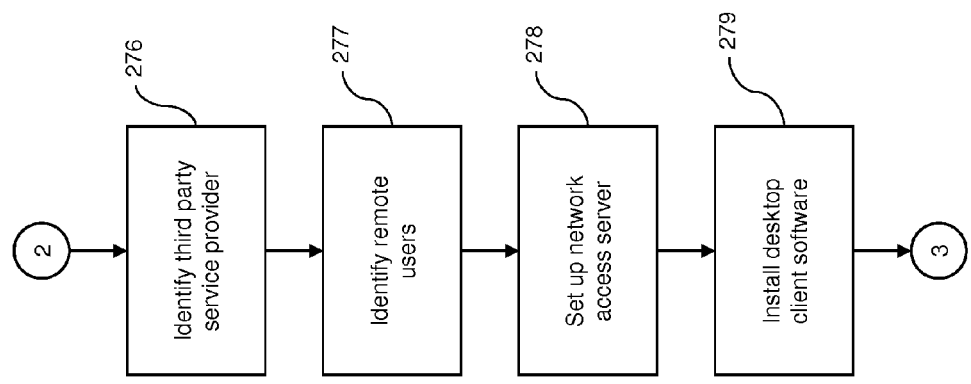
FIG. 12 is a flow diagram of a design process used in semiconductor design, manufacture, and/or test.

In FIG. 11, Step 260 begins the Virtual Private Network (VPN) process. A determination is made to see if a VPN for remote access is required 261. If it is not required, then proceed to 262. If it is required, then determine if the remote access VPN exists 264. If it does exist, then proceed to 265 via steps 276-279 of FIG. 12. After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then, build the large scale encryption into the VPN 271.

After the site to site VPN has been built or if it had been previously established, the users access the process software via the VPN 272. The process software is transported to the site users over the network via tunneling 273. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by a computer, connectivity graphs among users for each service provided by a single multi-service provider, which provides telephone service, including at least one of a landline telephone service and a cellular telephone service, and digital service, including at least one of a digital broadband service and a digital cable service, said connectivity graphs for said telephone service and said digital service including a number of common users represented as nodes in said connectivity graphs;
    creating, by said computer, a unified graph that merges said connectivity graphs for said telephone service and said digital service, said creating of said unified graph comprising:
        identifying a direct connectivity between a first node and a second node when said first node is connected to said second node by a first edge in said unified graph, and a duration of said direct connectivity;
        identifying a common friend connectivity between a third node and a fourth node when said third node is connected by a second edge to a first intermediary node, which is connected by a third edge to said fourth node in said unified graph, and a duration of said common friend connectivity; and
        identifying a community connectivity including a clique connectivity further including a fifth node, a sixth node, a second intermediary node, and a third intermediary node, when said fifth node and said sixth node are identified by said direct connectivity, said second intermediary node and said third intermediary node are identified by said direct connectivity, and said second intermediary node and said third intermediary node, respectively, are both identified by said common friend connectivity between said fifth node and said sixth node, and a duration of said community connectivity;
    assigning, by said computer, a first trust value between said each pair of users, based on values associated with each of said direct connectivity, said common friend connectivity, and said community connectivity, and durations of each of said direct connectivity, said common friend connectivity, and said community connectivity;
    determining, by said computer, a number of shared areas of interest between each pair of users in said unified graph, based on identification of any of: file names, key words, and metadata from digital data transmitted to said each pair of users;
    determining, by said computer, a number of shared contents between said each pair of users in said unified graph, based on identification of any of TV programs, movies, or video clips digitally transmitted to said each pair of users;
    assigning, by said computer, a second trust value to said each pair of users, based on said number of shared areas of interest and said number of shared contents between said each pair of users;
    creating a trust matrix, each element of said trust matrix corresponding to a node of said unified graph that has a third trust value based on said first trust value and said second trust value; and
    identifying, by said computer, peers in said unified graph, based on similarities of said third trust value.

2. The method of claim 1, a combination of said first trust values associated with any of said direct connectivity, said common friend connectivity, and said community connectivity, and with any of said durations of each of said direct connectivity, said common friend connectivity, and said community connectivity, being normalized.

3. The method of claim 2, connectivity in said unified graph being determined by exceeding a threshold value of said normalized combination of said first trust values associated with any of said direct connectivity, said common friend connectivity, and said community connectivity, and with any of said durations of each of said direct connectivity, said common friend connectivity, and said community connectivity.

4. The method of claim 1, said third trust value being normalized and being divided into ranges, corresponding to one of quartiles and quintiles.

5. The method of claim 4, each of said ranges identifying a corresponding one of said peers.

* * * * *